Nov. 17, 1931.  P. W. LEHMAN  1,832,489
TIRE FORMER AND CHUCK
Filed Dec. 31, 1927   2 Sheets-Sheet 1

INVENTOR.
Paul W. Lehman
BY
Robert V. Harney
ATTORNEY.

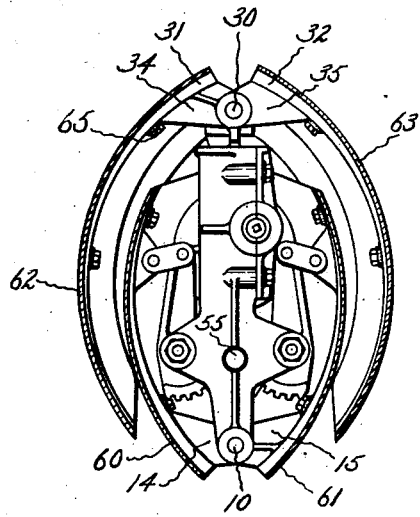
Fig. 3.
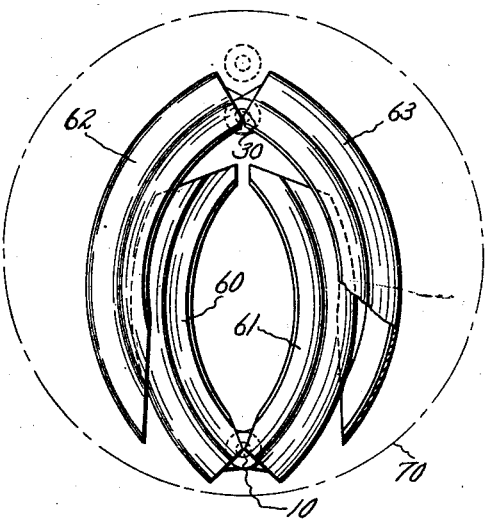
Fig. 4.
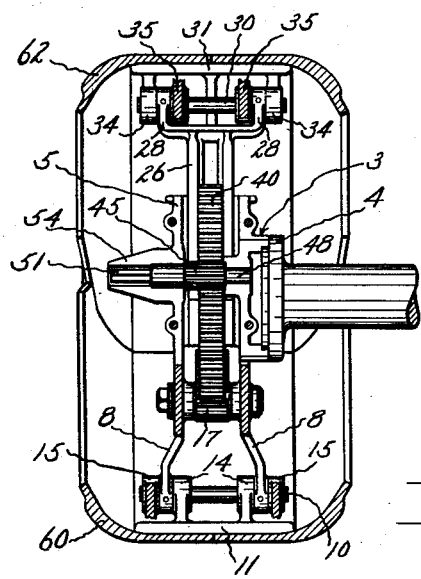
Fig. 5.
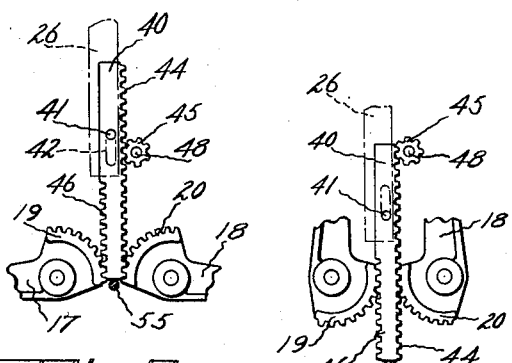
Fig. 6.
Fig. 7.

Patented Nov. 17, 1931

1,832,489

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE FORMER AND CHUCK

Application filed December 31, 1927. Serial No. 243,837.

My invention relates to collapsible tire building formers and has for one of its objects the provision of a chuck of simple construction which will collapse the former to dimensions permitting easy removal of the tire casing built thereon. A further object is to provide a structure permitting substitution of different types or shapes of formers without disturbing the parts of the collapsing mechanism. Other and further objects will be apparent from the following specification and claims:

In the accompanying drawings which illustrate one embodiment of my invention

Fig. 3 is a view similar to that of Fig. 2 but showing the chuck and former in collapsed position;

Fig. 4 is a diagrammatic view showing the collapsed former and its points of attachment to the chuck in comparison with its expanded circumference;

Fig. 5 is a section substantially on line 5—5 of Fig. 2;

Fig. 6 is a detail of the operating pinion rack and gear segments showing the parts in the position they occupy when the chuck is expanded, and Fig. 7 is a view similar to Fig. 6 but with the parts in contracted position.

Figure 1:
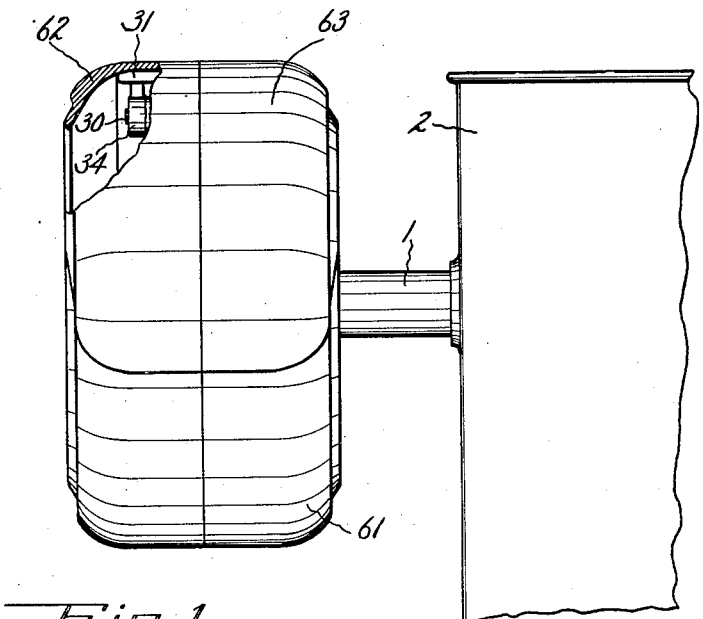
Fig. 1 is a front elevation with parts broken away showing the tire former in relation with parts of a tire building machine.

Referring to the drawings; 1 designates the shaft of a tire building machine which is adapted to be driven from any suitable power unit enclosed in housing 2. The chuck support 3 is secured to the end of shaft in any suitable way as indicated at 4. The support 3 comprises a channeled body portion 5, provided with a cover plate 6 secured to the body as by cap screws 7, and is formed with downwardly projecting spaced arms 8. A shaft 10 is carried in the ends of arms 8 upon which are pivoted two former supporting segments 11 and 12, by means of bearings formed in lugs 14—14 and 15—15, respectively, secured to or made integral with segments 11 and 12. Two arms 17 and 18, provided respectively with gear segments 19 and 20, are pivoted in arms 8 as at 21 and 22 and the arms 17 and 18 are respectively connected to segments 11 and 12 by links 23 and 24. In the channeled portion 5 of support 3 is slidably mounted a channel member 26 provided at its upper end with arms 28 in which are carried a shaft 30 upon which are freely pivoted two former supporting segments 31 and 32 by means of bearings formed in lugs 34—34 and 35—35, respectively secured to, or made integral with, segments 31 and 32. Member 26 is adapted to be reciprocated within support 5 and arms 17 and 18 to be swung about their pivots by means of a rack 40 sliding within member 26 and secured to the latter by a pin 41 sliding in a slot 42 formed in the rack. As is best shown in Figures 6 and 7, rack 40 is provided on one side, for substantially its entire length, with teeth 44 which are engaged by a pinion 45 and gear segment 20 of arm 18, and on the other side is provided with teeth 46 in engagement with gear segment 19 of arm 17. Pinion 45 is secured to a shaft 48 journaled in bearings 50 formed in support 5 and plate 6, the outer end of shaft 50 being squared as at 51 to receive a socket wrench by which the pinion may be rotated. As shown in Figure 5, the squared portion 51 preferably projects into and is guarded by a boss 54 formed in member 5. Rack 40 is adapted to be locked in outer position by means of a pin 55 slidably mounted in member 5 and adapted to be projected beneath the end of the rack as shown in Figure 6. Segments 11, 12, 31 and 32 normally form a complete annulus and are adapted to respectively support former segments 60, 61, 62 and 63 which are releasably secured to the supporting segments by means of screw bolts 65. Different types and shapes of formers may therefore be substituted without disturbing any of the chuck parts or removing the chuck from shaft 1.

Figure 2:
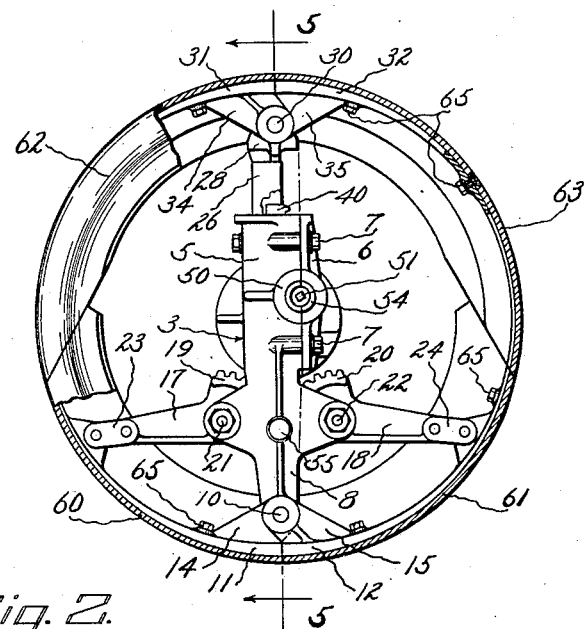
Fig. 2 is a side elevation of the tire former and chuck parts being broken away, the chuck and former being in expanded position.

The operation of the chuck will now be described. With the parts in the position shown in Figures 2 and 6, pin 55 is withdrawn and a socket wrench applied to the square end of shaft 48 to rotate pinion 45 and move rack 40 downwardly. Due to the lost motion of pin and slot connection 41—42 arms 17 and 18, through gear segments 19 and 20, are thus moved upwardly to swing segments 60 and 62 towards the center an amount to clear the lower edges of segments 62 and 63 before member 26, carrying segments 62 and 63, starts its downward movement. Continued rotation of pinion 45 brings the parts to the position shown in Figures 3 and 4. As will be understood, segments 62 and 63 drop by their own weight pivotally about shaft 30. The reverse movement of pinion 45 restores the former to annular condition in an obvious manner, segments 60 and 61 swinging segments 62 and 63 ahead of them. The operation of resetting the former may be facilitated by rotating the chuck 180° from that shown in Figures 2, 3 and 4, in which position segments 62 and 63 swing into continuity about their pivot 30 by their own weight, obviating the necessity of forcing them into position by contact with the positively operated segments 60 and 61. A substantial contraction along all dimensions is secured, as will be clear from Figure 4, where the normal circumference of the core is indicated by the dotted line 70. As shown in the latter figure the pivot 30 moves from dotted position to full line position substantially decreasing the diameter through the pivot points, to which decrease in diameter is added the decrease due to the spreading of the heels of the segments at both pivots.

Having thus described my invention, I claim:

1. A collapsible tire former comprising a support positioned within the annulus of the former, consisting of a body portion and a member slidable therein, a pair of former segments pivoted at one end of the body portion, a pair of former segments freely pivoted to the free end of the sliding member, and means carried by the body portion of the support operable to positively swing the first two segments toward and from the support and to reciprocate the sliding member in the body of the support.

2. A collapsible tire former comprising a support positioned within the annulus of the former, consisting of a body portion and a member slidable therein, a pair of former segments pivoted at one end of the body portion, a pair of former segments freely pivoted to the free end of the sliding member, a rack reciprocably mounted in the support, a pinion for driving the rack, a lost motion connection between the rack and the slidable member, a pair of arms pivoted on the body portion of the support, and gear segments on said arms and in engagement with the rack, the free ends of said arms being operably connected to the first mentioned former segments.

3. A collapsible tire former comprising a longitudinally retractible support positioned diametrically within the annulus of the former, a pair of former segments pivoted at one end of said support, means carried by and rotatable with the support to positively swing said segments toward and from the support and a second pair of former segments pivoted at the opposite end of the support.

4. A collapsible tire former comprising a longitudinally retractible support positioned diametrically within the annulus of the former, a pair of former segments pivoted at one end of said support, means carried by and rotatable with the support to positively swing said segments toward and from the support and to longitudinally retract and expand the support and a second pair of former segments pivoted at the opposite end of the support.

5. A collapsible tire former comprising a support positioned diametrically within the annulus of the former, two former segments pivoted at one end of the support, two former segments freely pivoted at the opposite end of the support and means carried by and rotatable with the support operable to positively swing the first two segments toward and from the support and to move the pivot of the two opposite segments, subsequent to the start of said swinging movement, toward and from the first mentioned pivot.

PAUL W. LEHMAN.